United States Patent [19]

Lucas

[11] Patent Number: 4,902,195
[45] Date of Patent: Feb. 20, 1990

[54] DEVICE FOR AUTOMATICALLY PILING UP FLAT ELEMENTS

[75] Inventor: Raymond Lucas, Villandraut-Prechac, France

[73] Assignee: Bobst SA, Switzerland

[21] Appl. No.: 586,048

[22] Filed: Mar. 5, 1984

[30] Foreign Application Priority Data

Mar. 11, 1983 [FR] France ............................ 83 04185

[51] Int. Cl.[4] ............................................. B65G 57/10
[52] U.S. Cl. ............................ 414/799; 414/794.3; 414/789.9; 414/793.8; 414/927; 198/774
[58] Field of Search ............... 414/662, 608, 660, 254, 414/281, 282, 673, 793.4, 794.2, 793.8, 789.9, 794.1, 791.6, 794.3, 792.7, 794.6, 792.6, 789.8, 790, 788.9, 789, 799, 927; 271/84; 198/750, 429, 774, 430, 488

[56] References Cited

U.S. PATENT DOCUMENTS

| | | | |
|---|---|---|---|
| 3,221,870 | 12/1965 | Pagay | 198/774 |
| 3,295,703 | 1/1967 | Schiepe | 414/85 X |
| 3,630,319 | 12/1971 | Peterson et al. | 187/58 |
| 3,737,053 | 6/1973 | Lunden | 414/84 X |
| 3,970,191 | 7/1976 | Oldfield et al. | 198/774 X |
| 4,043,459 | 8/1977 | Moreau | 414/82 X |
| 4,067,456 | 1/1978 | Schmitt | 414/84 X |
| 4,255,074 | 3/1981 | Meratti et al. | 414/85 X |
| 4,290,723 | 9/1981 | Johansson | 414/83 |

FOREIGN PATENT DOCUMENTS

| | | | |
|---|---|---|---|
| 2407155 | 6/1979 | France | 414/85 |
| 0129661 | 10/1979 | Japan | 414/85 |

Primary Examiner—Frank E. Werner
Attorney, Agent, or Firm—Hill, Van Santen, Steadman & Simpson

[57] ABSTRACT

A device for piling successive layers of batches of blanks such as cardboard box blanks on a support surface characterized by a vertically movable table positioned to receive a layer of batches from a delivery conveyor and being movable from the level of the delivery conveyor to a level of a support surface for receiving the layer. The table includes a fork arrangement for lifting the layer off the surface of the table and shifting it horizontally over the support surface and includes a comb arrangement coacting with the forks to maintain the layer on the support surface as the forks are withdrawn.

11 Claims, 7 Drawing Sheets

DEVICE FOR AUTOMATICALLY PILING UP FLAT ELEMENTS

BACKGROUND OF THE INVENTION

The present invention is directed to a device for piling up successive layers of batches of blanks, such as batches of cardboard box blanks, on a support surface formed by a pallet, a base plate or a loading support.

There are already numerous devices called palletizers which automatically pile up various elements on pallets. Generally, the elements to be piled up, which elements are taken separately or by batches, are quite heavy and have a rectangular shape. These devices generally work quite well. However, for building up a pile of thin blanks or cardboard sheets, which are delivered as batches a few inches high or more at an end of the processing machine, these devices are inadequate and of almost no use.

The batches of blanks or sheets, which are delivered to palletizing stations, are generally not tied up and thus these batches make an automatic and accurate piling-up of the blanks very difficult and almost impossible with the palletizing equipment which is presently known. Each time a new layer is laid on the previous unsteady layer, the blanks are always subject to a risk of either slipping or falling over.

SUMMARY OF THE INVENTION

The present invention is directed to a device which eliminates the prohibitory drawbacks of the already known palletizers. To accomplish these goals, the present invention is directed to a device for piling up successive layers of batches of blanks, such as batches of cardboard box blanks, on a support surface which may be a pallet, a base plate or any loading support. The device comprises delivery means for moving batches of blanks into the device, a frame, a horizontal table having parallel extending rollers and means to drive said rollers, said table being mounted in said frame for vertical movement, means for moving said table between a fixed loading level to receive the layer of batches from the delivery means and variable unloading levels for unloading the layer of batches onto the support surface, transfer means for moving the layer of batches from the delivery means to the table, said table having unloading means for transferring the layer from the table onto the surface including a row of thin fork members or forks extending parallel to the rollers of the table and spaced to be received between the rollers, first means for vertically shifting the fork members between a retracted position below a horizontal plane of the rollers to an elevated vertical position above the plane, second means for horizontally shifting the forks along a direction parallel to the rollers between a first position above the rollers and a second extended position over said support surface and comb means being mounted for movement between a retracted position allowing movement of the forks with a layer thereby and a blocking position for holding the layer on the support surfaces as the forks are moved from the second to the first position.

Preferably, the means for moving the table include a chain system having a counterweight for balancing the weight of the table and equipment thereon which chain system utilizes guiding means including a plurality of rollers engaging a track to maintain the position of the table. Preferably, the forks have a thin drawn-out or tapered blade construction with a thicker end being pivotably attached to a support plate which is positioned the greatest distance from the pile being formed. The first means for vertically shifting the fork members include jacks which raise and lower the supporting plate in a frame of the table. Preferably, each of the forks is mounted at one end to a shoe member which engages the support plate. Thus, when lowering the table with the forks in an extended position, engagement on top of a pallet or a pile will cause pivoting of the forks and the shoe with the pivoting creating a stop signal by means for determining the pivoting of the shoe. Preferably, the means for determining the pivoting comprises an outlet for a pneumatic circuit being covered by the shoe so that as the shoe pivots, pneumatic pressure escapes to generate a signal at a pneumatic switch.

The comb means preferably includes a plate mounted for rotation above the row of forks and has teeth or fingers for extending between the forks when in the blocking position. Preferably, the comb means is mounted in a sub-frame which is mounted for shifting on the frame of the table to enable pressing the edges of a portion of the pile either during retraction of the forks from the second position to the first position or thereafter. In one embodiment of the comb means, the teeth are separate blade members which freely move in a vertical direction on a plate and are held in an extended position due to the force of gravity. In the other embodiment, the fingers or teeth are integral with the rest of the plate of the comb.

Preferably, the device is provided with various stops. These include a retractable vertical stop disposed between the delivery means and the table, a vertical stop on the table adjacent the furthermost roller from the delivery means and a vertical stop extending parallel to the direction of movement of the batches on the delivery means.

DESCRIPTION OF THE PREFERRED EMBODIMENTS

Figure 1:
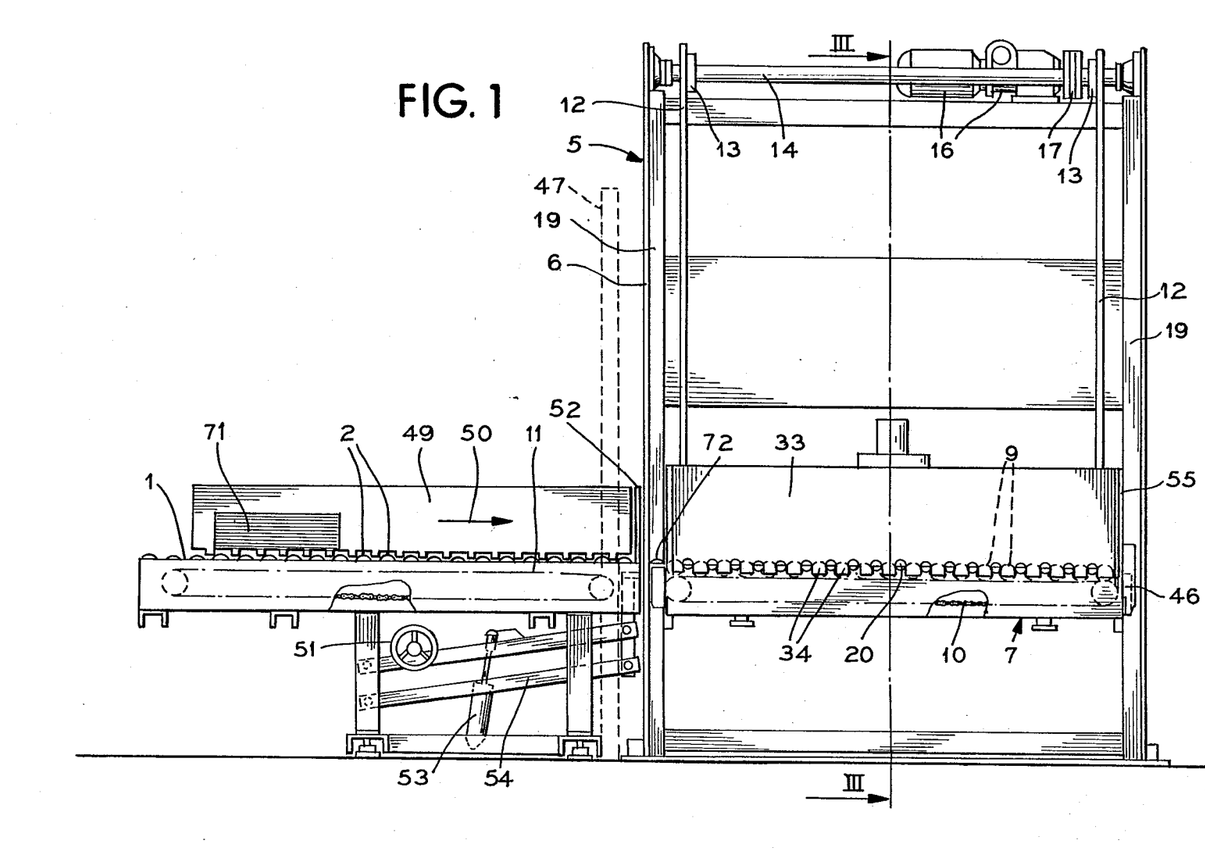
FIG. 1 is a front view of the automatic palletizer in accordance with the present invention with portions broken away for purposes of illustration.
Figure 2:
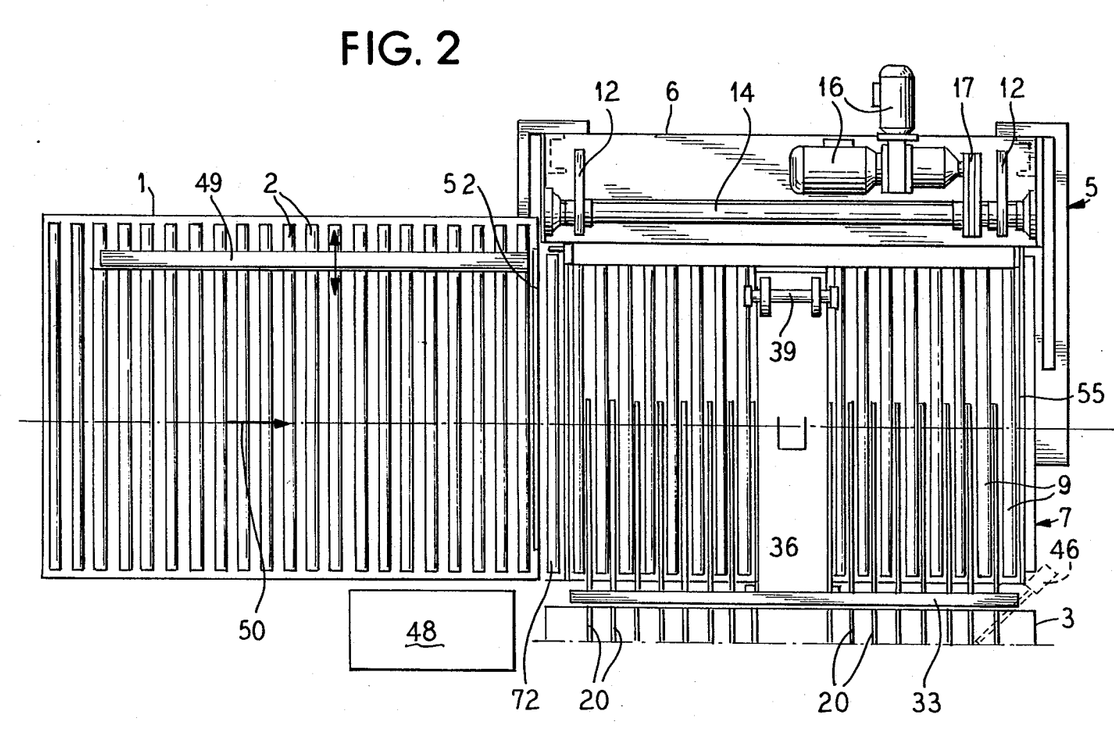
FIG. 2 is a plan view of the palletizer of FIG. 1.
Figure 3:
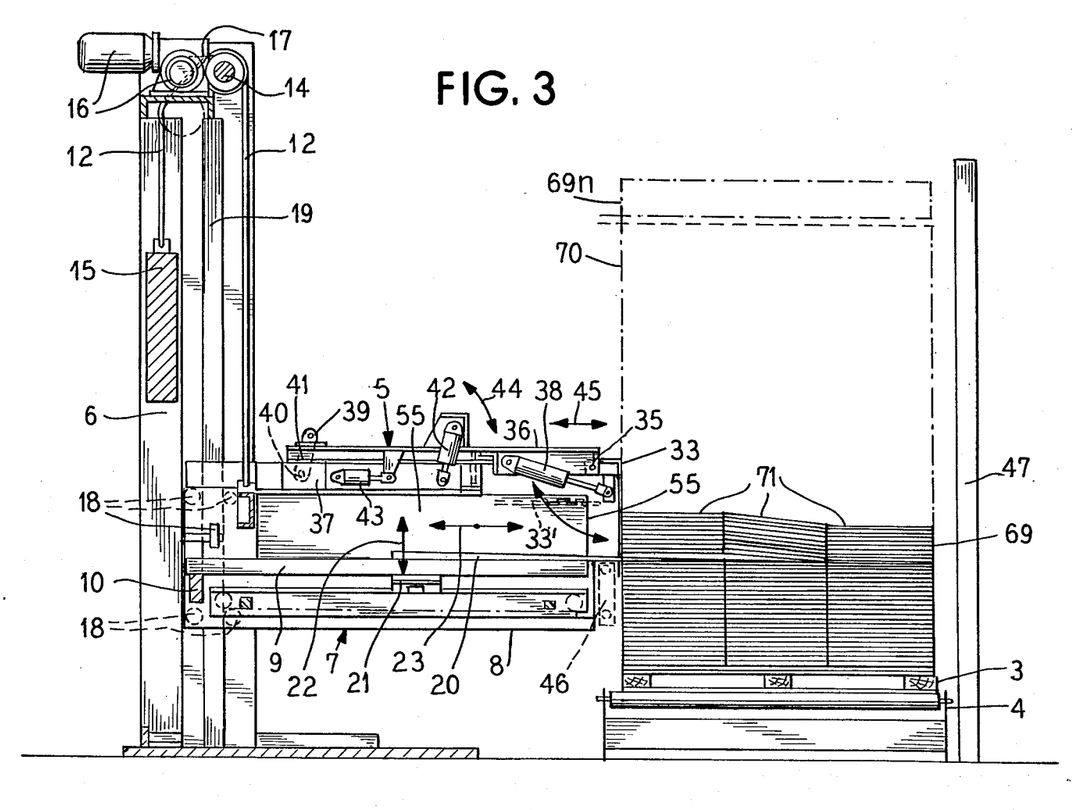
FIG. 3 is a cross-sectional view taken along line III—III of FIG. 1 with portions in elevation for purposes of illustration.

The principles of the present invention are particularly useful in a palletizer generally indicated at 5 in FIGS. 1, 2 and 3. The palletizer 5 includes a conveyor 1, which contains driven rollers 2 and forms means for delivering batches of blanks to be loaded on a pallet 3 (FIGS. 2 and 3). As illustrated in FIG. 3, the pallet 3 is positioned on a conveyor 4 which also has motorized or driven rollers so that a loaded pallet can be removed.

The palletizer 5 is provided with a frame which has a fixed gantry 6 which supports a table generally indicated at 7 for vertical movement in the frame. The table 7 has a table frame 8 which supports an adequate number of rollers 9 which extend parallel to the rollers of the conveyor 1 and are rotated by drive means 10 which, as illustrated, consist of an endless belt touching the lower surfaces of the roller and driven by a motor located at one end of the frame 8. It should be noted that rollers 2 of the conveyor 1 can be driven by a similar drive means 11 which is illustrated in FIG. 1.

The gantry 6 has a pair of vertical guide rails 19 which are engaged by rollers 18 which are secured on the frame 8 of the table 7. These rollers are in a vertically spaced relationship as illustrated in FIG. 3. Means are provided in the gantry for moving the table 7 in a vertical direction and this means include a pair of chains 12 which are attached to opposite ends of the table 7 and pass over a pair of spaced pinions or sprockets 13 which are keyed to an axle 14 at the upper end of the gantry 6. The other end of the chains 12 are connected to a counterweight 15, which compensates for the weight of the table 7 as well as the elements disposed thereon. The axle 14 is rotated by a moto-reductor system 16 which is connected to the axle 14 by a chain and sprocket system 17. Thus, the table will move in a vertical direction with the table being guided by the coaction of the rollers 18 on the guide rails or tracks 19.

Figure 4:
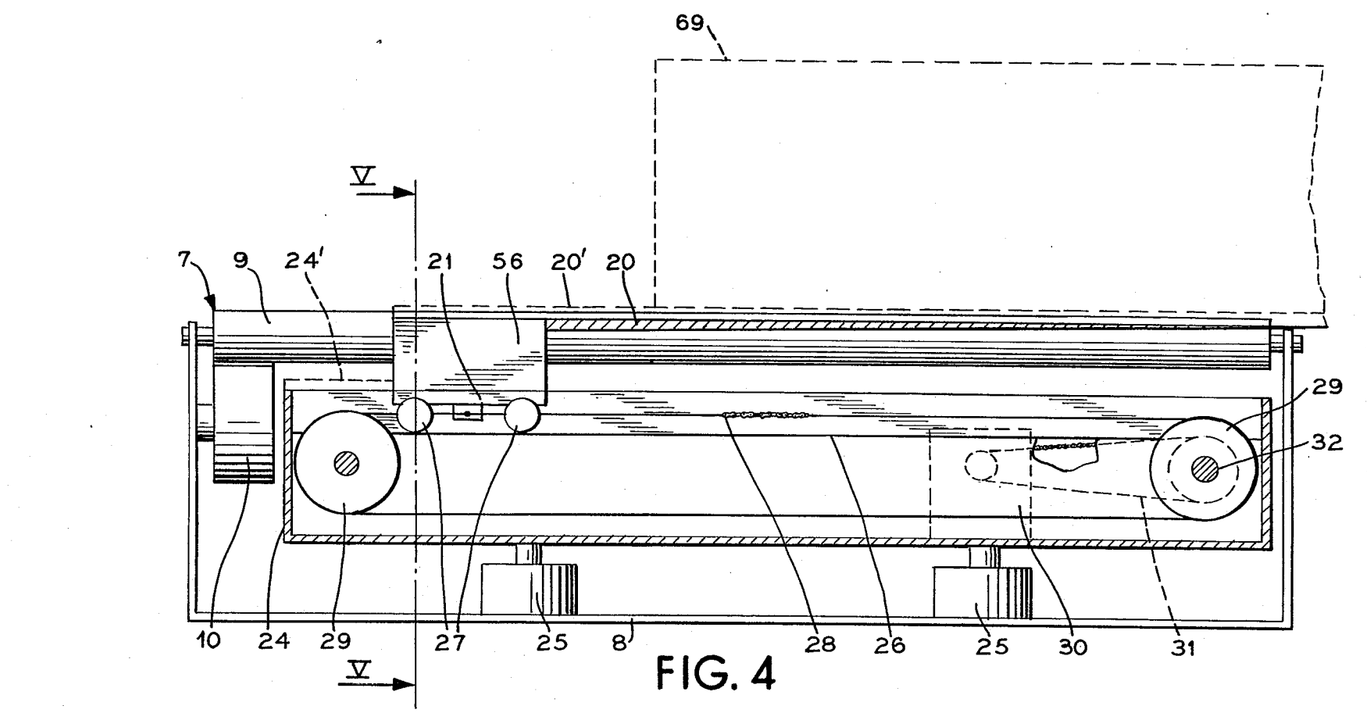
FIG. 4 is a cross-sectional view with portions in elevation of the table of the palletizer taken on a line similar to III—III of FIG. 1.
Figure 5:
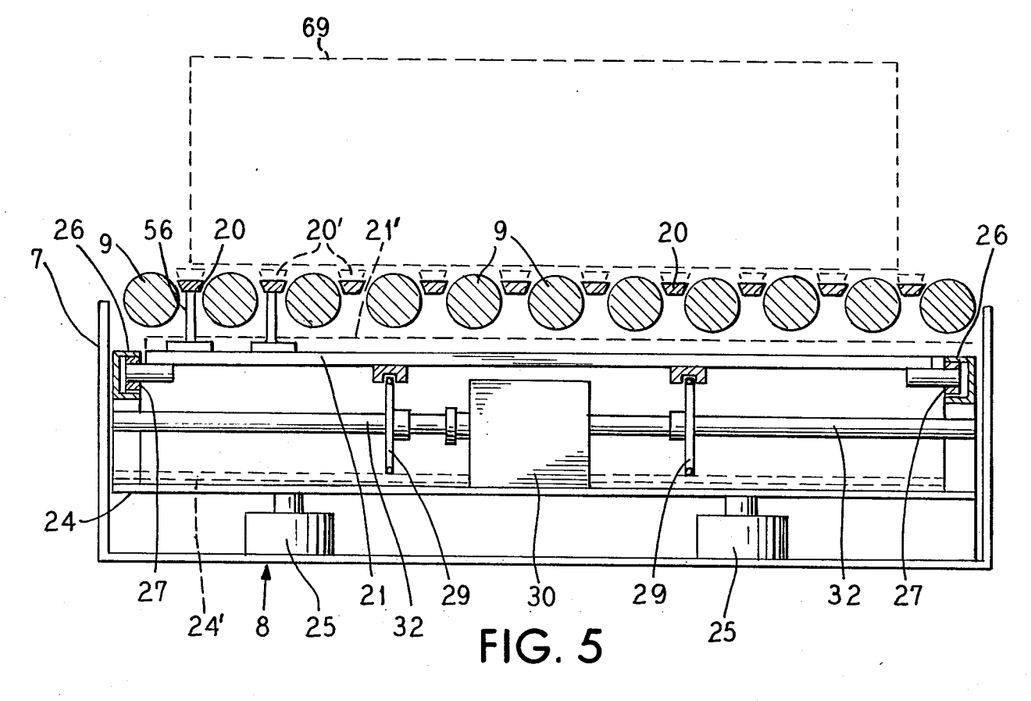
FIG. 5 is a cross-sectional view taken along line V—V of FIG. 4 with portions in elevation for purposes of illustration.

The frame 8 of the table 7 also supports unloading means for transferring a layer of batches from the table onto a surface of either a pallet or a surface of a pile of batches on a pallet. The unloading means includes a row of horizontal and parallel extending forks 20, which are mounted at an end opposite the pallet 3 to a support plate 21 or member (FIG. 3). The support plate 21 is movable both vertically in the direction of the double arrows 22 and horizontally in the direction of the double arrow 23. The forks 20 are thin blades or pins which are drawn out or tapered at their ends and are spaced so that they can lie parallel between adjacent rollers 9 of the table as best illustrated in FIG. 5. The means for actuating the support plate 21 along the directions 22 and 23 are best shown in FIGS. 4 and 5. As illustrated, the means includes a sub-frame 24, which supports the support plate 21. The sub-frame 24 is vertically movable in the frame 8 by a first means composed of four pneumatic pistons or jacks 25. The sub-frame 24 includes two horizontal and parallel extending channels or tracks 26 which receive guide rolls 27 that support the plate 21 in the sub-frame 24. A second means for shifting the support 21 in the tracks 26 as well as the forks 20 in a horizontal plane and in the direction of the double arrow 23 includes an endless chain belt 28 connected to the plate 21 and passing over sprockets 29. One of the sprockets 29 is keyed to a shaft 32 which is rotated by an electric motor 30 through a drive chain 31 (FIG. 4).

In FIGS. 4 and 5, the retracted position for the forks 20, the support member 21 and the sub-frame 24 are shown in bold lines and the elevated or raised vertical position is shown in broken lines at 20', 21'and 24'. The jacks 25 move these members between the two positions. When the forks 20 are in their elevated position 20', their upper surfaces are slightly higher than a plane defined by the upper surfaces of the rollers 9. However, when in the retracted position, the upper surfaces, best illustrated in FIG. 4, are below this plane.

The table 7 also includes comb means for maintaining the batches being unloaded on the surface of a pallet 3 or on a previous layer as the forks 20 are being retracted such as illustrated in FIG. 3. The comb means includes a retractable comb 33 which is a plate with a plurality of teeth or fingers 34 (FIG. 1) which extend between the forks 20. The comb 33 is tilted between a withdrawn position 33' which is illustrated in broken lines in FIG. 3 and the vertical position or blocking position which is shown in full lines in both Figures. Preferably, the comb 33 is pivoted around a horizontal axle 35 which extends perpendicular to the axes of the rollers 9 and is supported in a sub-frame 36 which is mounted for articulated movement on an axis extending perpendicularly to the roller 9 by a bracket 37 which is secured on the frame 8.

The comb 33 is pivoted between the blocking position and the retracted position by a pneumatic piston or jack 38 which is secured on the sub-frame 36 and attached to a lever connected to the comb. The sub-frame 36 as mentioned hereinabove can be pivoted around an axle 39, as illustrated by double arrow 44, by actuation of a pneumatic piston or jack 42 which extends between the sub-frame 36 and the bracket 39. As illustrated, the axle 39 extends between the sub-frame 36 and a link 41 which in turn is pivotally mounted by an axle 40 to the bracket 37. The frame thus can also shift in the direction of double arrow 45 by actuation of a pneumatic jack or piston 43 which in turn is connected between the bracket 37 and the sub-frame 36. Thus, the sub-frame 36 with the comb can be both horizontally shifted in the direction of arrow 45 as well as tilted in the direction of double arrow 44. This enables shifting the comb 33 against the edge of a stack and withdrawing it from an edge of the stack.

The correct position for the table 7 at the height of the conveyor 1 is achieved in a well known way with cams and electrical microswitches mounted between the gantry 6 on the one hand and an adequate area of the table 7 on the other hand. A correct level positioning of the table 7 with regard to the loading level of the more or less loaded pallet 3 can also be achieved with two sets of light receivers and transmitters shown by the photocell unit 46 which is attached to the table 7 to direct a beam of light at an angle such as illustrated in broken lines in FIG. 2. The light receivers and transmitters of the photocell 46 ar located at two different levels and transmit horizontal light beams across the pallet 3 which light beams are reflected, if they are not blocked by an obstacle, by a vertically extending catadioptric strip 47 which is positioned on the opposite side of the pallet adjacent a corner which is diametrically opposite to the photocells 46. A command from a synchronization and control unit for the various shiftings of the movable elements of the palletizer can be achieved by a control means 48 (FIG. 2) which includes a microprocessor which allows the programming of the automatic pack delivery cycles in view of the responses from the various sensors. It is also possible to utilize various sensors which provide signals to enable an operator to actuate the various operations or enable the control means 48 to provide the initial commands. It is noted that in order to simplify the drawings, the various energy sources for the driving elements and the electrical circuits are not illustrated.

To insure proper position of each of the packs or batches of blanks, the device is provided with various stops. To this arm, the conveyor 1 is provided with a stop 49, which is mounted to extend parallel to the running direction 50 of a pack or batch 71. The actual position along the axis of the rollers 2 is adjustable and can be controlled by a hand wheel such as 51 or other command system. A second, retractable stop 52 is arranged between the conveyor 1 and the table 7. This stop 52 is a vertical plate extending parallel to the rollers 2 and also the rollers 9 and is movable by a pneumatic piston or jack 53 through a parallelogram linkage system 54 between a blocking position illustrated in FIG. 1 and a retracted position allowing passage of batches between the conveyor and tube. In the illustrated blocking position, the pack or batch 71 of blanks will be prevented from moving onto the table of the palletizer. The table 7 also has a vertical stop plate 55 which extends parallel to the rollers 9 and is at the opposite end of the table from the end adjacent the conveyor 1.

Figure 6:
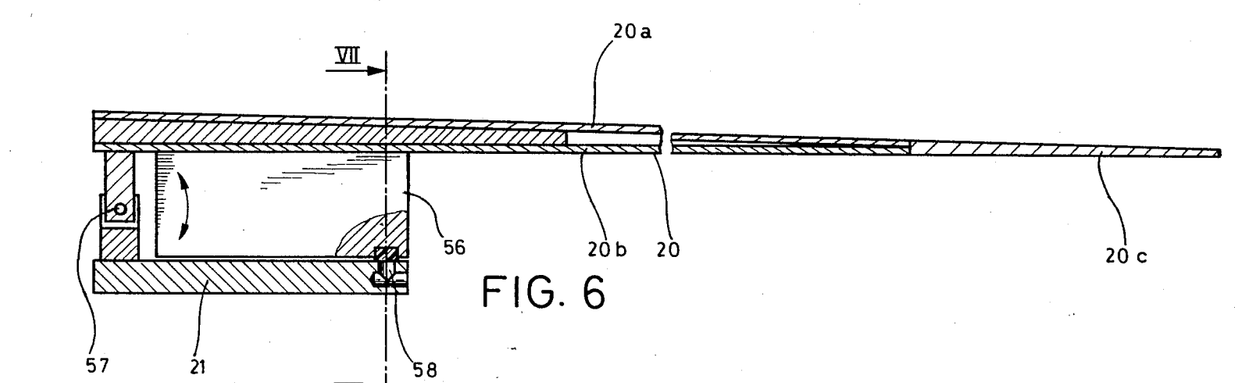
FIG. 6 is a cross-sectional view taken along the axis of one of the forks with portions in elevation for purposes of illustration.
Figure 7:
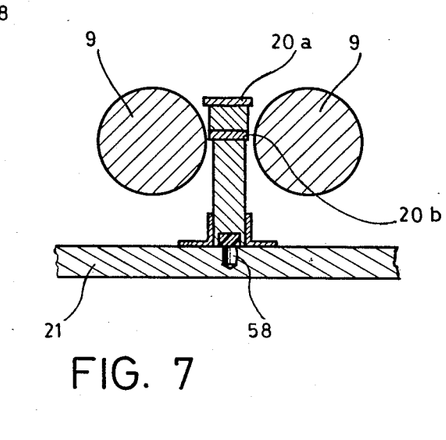
FIG. 7 is a cross-sectional view taken along lines VII—VII of FIG. 6.

As best illustrated in FIGS. 6 and 7, each of the forks 20 is preferably formed of two thin superimposed sheets 20a and 20b which form a slight angle to each other so that the fork gets progressively thinner as the distance from the attachment to a shoe 56 toward the free end occurs. As illustrated, the fork is tapered to the free end 20c, which is a solid plate. Preferably, the cross-section of the fork should be trapezoidal as illustrated in FIG. 7 to be easily inserted between the pair of adjacent rollers 9.

Each of the forks 20 adjacent the shoe 56 is pivotally mounted at 57 to the support plate 21. This pivotal mounting allows the shoe 56 to be raised above the plate 21 and thus expose an opening of a bore 58 which is formed in the plate 21. This bore 58 is in communication with pressurized air of a pneumatic command circuit schematically shown in FIG. 8. The command circuit provides means for sensing pivoting of the fork 20, which pivoting would occur when the fork is in the extended position above a surface of a pallet or a stack on the pallet and the fork is being lowered and engages this surface. When the pivotal movement is sensed, a signal to the means shifting the table in the vertical direction will cause a stopping of this movement.

Figure 8:
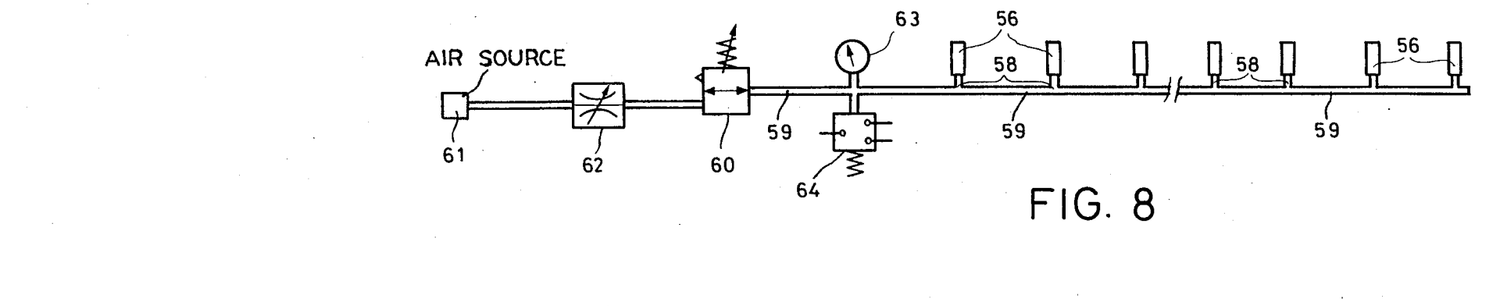
FIG. 8 is a schematic illustration of the pneumatic detector in accordance with the present invention.

Preferably, the sensing means as mentioned above is a pneumatic circuit, which is schematically illustrated in FIG. 8. The circuit includes a tube 59 which is connected in parallel to all of the bores 58. The tube 59 receives air under pressure from an air source 61 which air flows through a reducer 62 and a relief valve 60. In addition, a pressure gauge 63 and a pneumatic switch 64 are in communication with the tube or channel 59. As soon as one or more of the bores 58 is opened by raising a shoe 56 due to tilting of its fork, the pneumatic switch will sense the drop in pressure in the line 59 and create an electrical signal which is utilized to stop movement of the table 7.

Figure 9:
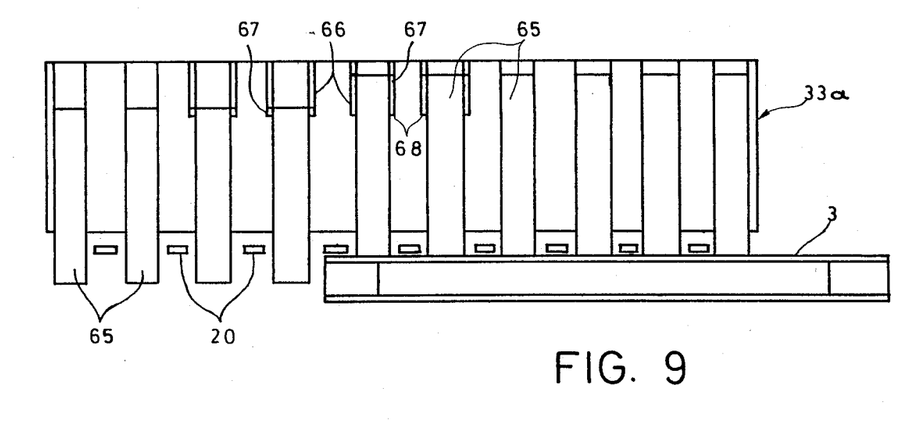
FIG. 9 is a side elevational view of an embodiment of a comb in accordance with the present invention.

An embodiment of the stop comb is illustrated in FIG. 9 is generally indicated at 33a. In this embodiment, the fingers which extend between the forks can be freely shifted and inserted and are telescopically mounted. Therefore, a plate of the comb is provided with a plurality of vertical sliding blades 65, which constitute the fingers. These blades as illustrated are mounted at regular intervals so that they will extend between adjacent pairs of forks 20. The arrangement for mounting the blades 65 include a guiding means 66 which insures a free and separate moving of each blade 65 in a vertical direction and includes a stop arrangement 68 which coacts with a stop arrangement 67 on the blade to limit the lower position illustrated in the left-hand side of FIG. 9. Thus, as illustrated on the right-hand side of FIG. 9, the bottom of the blades 65 engage on a surface such as a pallet 3, they can be elevated to the plane of the forks 20.

The machine described hereinabove will automatically constitute a pile of layers 69, one laid upon the other, on a pallet 3. The buildup of these layers into a complete load is shown schematically in chain lines at 70 in FIG. 3 and it is noted that this complete load will have the shape of a parallelepiped.

The loading operation is achieved with several layers successively lying one above the other and then the loaded pallet is removed and replaced automatically by an empty pallet 3. The delivering positioning and removing means of the pallets are not shown but are known per se. In the present description, a pack 71 is a batch of generally untied blanks brought by a conveyor 1 to be piled up. A layer is formed by a plurality of batches being laid in one single operation onto the pallet 3 or a previously laid layer by the forks 20 of the unloading means. It should be noted that the batches or packs 71 are approximately six to eight inches high and are composed of cardboard blanks delivered by a stripping device mounted before the conveyor 1.

The packs 71 are first collected on the conveyor 1 to produce the layer. Preferably, the layer will comprise twelve packs 71 which are arranged in three columns of four each. They are collected by raising a stop 52 to allow the accumulation of the packs 71 successively under the action of the driven rolls 2 of the conveyor 1. These driven or motorized rolls as well as the rollers 9 are positioned as close as possible to warrant the correct shifting of the cardboard piles or batches which are not very steady at high speeds. The great number of rollers with a fork between them allows the processing of small cardboard sheets. As soon as the required number of packs is created by the plate 52, the plate will be lowered by the jacks 53 and the rollers 2 will push the layer onto the table 7. Another roller 72 is mounted on the table 7 and is located between the conveyor 1 and the table 7 and insures an adequate passage from one unit or element to the other.

The packs 71 on the table 7 are carried by driven rollers 9 until they are stopped against the plate 55. During this operation, the forks 20 are in the lowered retracted position t extend below the plane of the rollers 9.

After the movement of the packs onto the table 7, the plate 52 is again raised to maintain the newly arriving packs and it should be noted that the machine is part of a continuous processing unit. The table 7 then locates the layer 69 on the supposedly empty pallet 3. As at the start, the table is positioned at the level of the conveyor 1 and the photocell unit 46 cannot detect anything between them and the catadioptric strip 47. The table is then lowered to reach the desired level and thus the plane of the forks 20 is located approximately one inch over the upper face of the empty pallet 3. When the table reaches this position, the forks are raised to their high position 20' by the first means which are the jacks lifting the support 24 so that the layer is brought above the plane of the rollers 9. Then the support plate 21 is shifted by the second means to have the forks extend over the piling area so that the layer 69 is supported by the forks 20 still in their high position and are shifted to be above the surface of the pallet 3. This shifting is, of course, regulated by adequate limit switches which also insures their synchronization.

As soon as the forks 20 are in the extended second position, the table 7 is again lowered until the forks 20 touch the pallet. As the lowering of the table is not stopped then, the forks will rise thus lifting the shoes 56 above the plate 21 to expose the holes of the bores 58. The losses that are created in the pneumatic circuit 59 create a stop signal from the switch 64 to stop the lowering of the table and the comb 33 is then pivoted to a blocking position prior to retracting the forks.

The positioning of the comb 33 is jointly achieved by means of the various pistons or jacks 38, 42 and 43 so that as the comb 33 is positioned it is aligned with the face of the pile 70 which is facing the table 7 and tilts back towards the latter without touching it. As soon as the comb 33 is positioned, the forks can be withdrawn while placing the perfectly aligned layer 69 onto the pallet as illustrated in FIG. 3. It is noted in FIG. 3 that the layer 69 is being deposited on a stack or pile which has already had several layers applied thereto. It is noted that table 7 has stopped just as the forks press onto the pile and although the forks are partly withdrawn, they still rest and press on the pile during the step of withdrawal. Thus, the forks perfectly maintain the pile and this is an important characteristic of the machine.

The comb 33 also aligns the layer 69 while it is being deposited on the pile. In addition, the comb 33 because the fingers extend below the plane of the forks 20 also engage and align the upper portion of the pile.

It is also to be noted that when the comb 33 is tilted back vertically and comes near to the already builtup pile, if the pile is leaning toward the table 7, it will be pushed by the comb and shifted back to the vertical plane of the pile 70. But if the pile is leaning in a direction opposite the table, the withdrawing of the forks 20 resting on it will also pull the pile toward and against the comb 30. As soon as the forks 20 are completely withdrawn, they are shifted to the retracted position and the comb shifts into its retracted position 33' thanks to the reversing drive of the jacks or pistons 38, 42 and 43. The table 7 then shifts back to the level of the conveyor 1 to receive a new layer 69. The balancing of the weight of the table 7 with the counterweight 15 enables the use of relative lightweight drive motor 16 for shifting of the table and thus the quite numerous piling-up cycles do not require too much energy because only the weight of the packs 71 of the layer 69 need to be carried by the motor. Furthermore, the balancing enables a relatively quick shifting of the table 7 as well as a precise positioning.

The above described cycle of taking the layer 69 and positioning it on the pile can be automatically accomplished. The vertical shifting of the loaded table is determined by the state of the receiver 46.

In FIG. 3, a last layer 69n, which is to be built up on the stack 7 is illustrated. A detector such as a limit switch on the table 7 with either stop the machine long enough to allow removal of the loaded pallet and to bring in a new empty pallet or will provide a command signal to automatically order the removal of the loaded pallet and its replacement by an empty one. One could eventually use aligning and calibrating steps for building up the perpendicular piles but they are not an obligation thanks to the stops such as 49, 52 and 55 and the comb 33.

An advantage of the modification of the comb 33a of FIG. 9 is that it allows an automatic raising of the fingers or blades 65, when they engage on the surface of the pallet 3. Thus, when the forks reach the level of the pallet, this automatic raising of the fingers will occur particularly when the first layer is laid on the pallet and when the first layer is not aligned with the edge of the pallet but is recessed thereto. When the comb 33 shifts away from the pallet, the fingers automatically fall back into their desired extended position.

The palletizer 5 can be operated automatically and enables utilizing high speeds for piling up the stacks on the pallet. In addition, it allows the operation to be performed in a perfectly secured condition.

The thin and drawn out profile of the forks 20, which will support high loads despite their almost completely overhanging structure, will allow a soft operation. The level difference between the forks 20 and the previous layer 69 or the pallet 3 is very small and progressive so that the blanks in each pack 71 cannot slip or become unaligned. The pressure of the forks 20 with their load on the previous layer as well as the aligning achieved by the comb 33 during the withdrawal of the forks continuously pushing against the previously builtup layer warrants perfectly balancing of the aligned piles. To conclude, the present invention is not only destined to the type of executions described hereinabove, but also includes all of the variations particularly regarding the shape of the forks 20 and the comb 30 which act to maintain the layer as the forks are withdrawn an also aligns the previously applied packs.

Although various minor modifications may be suggested by those versed in the art, it should be understood that I wish to embody within the scope of the patent granted hereon, all such modifications as reasonably and properly come within the scope of my contribution to the art.

I claim:

1. A device for piling up successive layers of batches of blanks, such as batches of cardboard box blanks, on a support surface, said device comprising delivery means for moving batches of blanks into said device, a frame, a horizontal table having parallel extending rollers and means to drive said rollers, said table being mounted in said frame for vertical movement, means for moving said table between a fixed loading level to receive a layer of batches from the delivery means and a variable unloading level for unloading the batches onto the support surface at a first side of the frame, said rollers coacting with the delivery means to transfer the layer of batches from the delivery means to the table, and unloading means in the table for transferring the layer in a direction parallel to the axes of the rollers from the table onto the support surface including a row of fork members extending parallel to the rollers of the table and spaced to be received between the rollers, first means for shifting the fork members between a retracted position below a horizontal plane of the rollers to an elevated position above the plane, second means for shifting the fork members in the direction parallel to the axes of the rollers between a first position above the rollers and a second position projecting out of the first side of the frame and above said support surface, and comb means being mounted for movement between a retractable position allowing movement of the fork members with a layer thereby and a blocking position for holding the layer on the support surface as the fork members are moved from the second position back to the first position.

2. A device according to claim 1, wherein the frame has a gantry disposed along a second side opposite the first side and the support surface, said means for moving the table including a counterweight for balancing the weight of the table, a pair of chains connected to the counterweight and the table and being engaged on sprockets keyed to an axle, and means for rotating the axle for raising and lowering the table along said gantry, and said gantry including guide means for guiding the table as is raised and lowered.

3. A device according to claim 1, wherein each of the fork member has a thin drawn out blade construction with a thicker end being secured to a support plate, said unloading means including a sub-frame having a horizontally extending track slidably mounting the support plate, said sub-frame being shifted vertically relative to a frame of the table by said first means comprising pneumatic jacks and said support plate being shifted along the track by said second means comprising a belt drive system.

4. A device according to claim 3, wherein each of said fork member is mounted on said support plate by a pivotal mounting means and has a shoe resting on said support plate, said support plate having sensing means engaging said shoe so that pivoting of the fork members can be determined.

5. A device according to claim 4, wherein said sensing means comprises a pneumatic circuit under pressure, said circuit having a pneumatic switch being actuated by a change in the pneumatic pressure, said circuit being connected to a channel in the support plate having an opening closed by said shoe so that when the shoe is lifted from the plate, pneumatic pressure is lost through the exposed opening to create a sensed movement at the switch.

6. A device according to claim 1, wherein said comb means includes a plate with a plurality of teeth extending between adjacent fork members.

7. A device according to claim 6, wherein the comb means includes means mounting the plate having said teeth, said means for mounting including a pair of arms supported on a frame of the table, said plate being pivotally mounted on said arms and a pneumatic piston for pivoting the plate of the comb means between the retracted and blocking position.

8. A device according to claim 7, wherein each of the fingers of the comb means are retractable fingers comprising blades freely movable on the plate and held in an extended position by gravity.

9. A device according to claim 1, which includes a vertically extending retractable stop being positioned between the table and the delivery means.

10. A device according to claim 1, wherein the table is provided with a vertically extending stop lying in the plane extending parallel to the rollers and arranged at a third side of the table furthest removed from the delivery means 11. A device according to claim 1, wherein the table includes detecting means for determining the height of a pile, said detecting means providing a single signal to control means for controlling the means for moving the table in the frame.

* * * * *